(12) United States Patent
Gilbert-Eyres et al.

(10) Patent No.: US 12,722,629 B1
(45) Date of Patent: Sep. 1, 2026

(54) PREVENTING IMPROPER VEHICLE USAGE

(71) Applicant: GM Global Technology Operations LLC, Detroit, MI (US)

(72) Inventors: Matthew Edward Gilbert-Eyres, Rochester Hills, MI (US); Eric T. Hosey, Rochester Hills, MI (US); Russell A. Patenaude, Macomb Township, MI (US); Noah Stone, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/202,322

(22) Filed: May 8, 2025

(51) Int. Cl.

| | |
|---|---|
| ***B60W 30/09*** | (2012.01) |
| ***B60Q 1/50*** | (2006.01) |

(Continued)

(52) U.S. Cl.

CPC ............. *B60W 30/09* (2013.01); *B60Q 1/525* (2013.01); *B60Q 5/006* (2013.01); *B60W 30/146* (2013.01); *B60W 50/0097* (2013.01); *B60W 50/14* (2013.01); *B60W 2050/143* (2013.01); *B60W 2050/146* (2013.01); *B60W 2420/403* (2013.01); *B60W 2420/54* (2013.01); *B60W 2520/10* (2013.01); *B60W 2554/4029* (2020.02); *B60W 2554/4041* (2020.02);

(Continued)

(58) Field of Classification Search

CPC ...... B60W 30/08; B60W 30/09; B60W 50/14; B60W 50/0097; B60W 2050/143; B60W 2050/146; B60W 2420/403; B60W 2420/54; B60W 2520/06; B60W 2520/10; B60W 2554/4029; B60W 2554/4041; B60W 2554/406; B60W 2554/80; B60W 2556/45; B60W 2556/50; B60W 2720/10; G08G 1/005; G08G 1/166; G06V 20/53; G06V 20/58; G05D 1/241; G05D 1/617; G05D 1/618; G05D 1/621; G05D 1/633; G05D 1/637; G05D 1/686; G05D 2107/17; B60Q 1/525; B60Q 5/006

See application file for complete search history.

(56) References Cited

U.S. PATENT DOCUMENTS

| | | | |
|---|---|---|---|
| 6,608,559 B1 * | 8/2003 | Lemelson ............ | G08B 15/004 382/104 |
| 10,223,919 B2 * | 3/2019 | Bai ........................ | B60K 35/29 |

(Continued)

FOREIGN PATENT DOCUMENTS

| | | |
|---|---|---|
| DE | 102017204368 A1 | 9/2018 |
| DE | 102020100024 A1 | 7/2020 |
| DE | 102021003353 A1 | 1/2023 |

*Primary Examiner* — Brandon Z Willis

(74) *Attorney, Agent, or Firm* — Vivacqua Crane, PLLC

(57) ABSTRACT

A system within a vehicle for detection and prevention of improper usage of the vehicle includes a plurality of onboard sensors and a wireless communication module, each in communication with a system controller and adapted to collect data related to the presence of a high pedestrian density location (HPDL) within a pre-determined proximity of the vehicle, and a predictive module adapted to identify an HPDL, define a medium threat perimeter around the HPDL, define a high threat perimeter around the HPDL, establish a threat level, and initiate counter measures based on the threat level.

20 Claims, 3 Drawing Sheets

(51) Int. Cl.

| | |
|---|---|
| ***B60Q 5/00*** | (2006.01) |
| ***B60W 30/14*** | (2006.01) |
| ***B60W 50/00*** | (2006.01) |
| ***B60W 50/14*** | (2020.01) |

(52) U.S. Cl.

CPC ... *B60W 2554/406* (2020.02); *B60W 2556/45* (2020.02); *B60W 2556/50* (2020.02); *B60W 2720/10* (2013.01)

(56) References Cited

U.S. PATENT DOCUMENTS

| | | | | |
|---|---|---|---|---|
| 2017/0297568 | A1* | 10/2017 | Kentley | B60W 30/09 |
| 2024/0062656 | A1* | 2/2024 | Forscher | G08G 1/163 |

* cited by examiner

FIG. 1

PREVENTING IMPROPER VEHICLE USAGE

INTRODUCTION

The present disclosure relates to a system for detecting improper usage of a vehicle and implementing counter measures adapted to prevent continued improper use.

ADAS within a vehicle is equipped to intervene in certain circumstances, taking over control of specific vehicle function to keep the vehicle on an appropriate trajectory. ADAS is adapted to intervene only when an action of the vehicle, such as drifting toward a lane marker of a lane within which the vehicle is traveling, appears to be unintended by the driver. ADAS inhibit software prevents the ADAS from intervening in circumstances where a driver is actively controlling the vehicle.

Thus, while current methods and systems achieve their intended purpose, there is a need for a new and improved system that disables ADAS inhibit software and allows the system to take active steps to take over control of subsystems within a vehicle to stop improper usage of the vehicle.

SUMMARY

According to several aspects of the present disclosure, a system within a vehicle for detection and prevention of improper usage of the vehicle includes a plurality of onboard sensors and a wireless communication module, each in communication with a system controller and adapted to collect data related to the presence of a high pedestrian density location (HPDL) within a pre-determined proximity of the vehicle, and a predictive module within the system controller and adapted to identify an HPDL, and, when an HPDL is identified define a medium threat perimeter around the HPDL, define a high threat perimeter around the HPDL, establish a threat level based on proximity of the vehicle to the medium threat perimeter and the high threat perimeter, and vehicle operating parameters, and initiate counter measures based on the threat level, including at least one of provide, via a human machine interface (HMI) within the vehicle, visual and/or audio alerts to a driver of the vehicle, provide, via an external speaker, external audio and/or visual alerts, limit, via communication with an advanced driver assistance system (ADAS) within the vehicle, a maximum speed of the vehicle, and send, via the wireless communication module, notification to a remote third party.

According to another aspect, the system further includes a reactive module within the system controller and adapted to determine that the vehicle is being used improperly upon the occurrence of determination, by the system controller, based on data from a driver monitoring system, that the driver is actively and intentionally controlling the vehicle, and any one of detection, by impact detection sensors within the vehicle, of multiple impacts, actuation of a pedestrian protection algorithm within the system controller, detection, by the system controller, via an external microphone, sounds that indicate distress of pedestrians within proximity of the vehicle, or detection, by impact detection sensors within the vehicle, of a single impact with a pedestrian, and upon determination that the vehicle is being used improperly, initiate counter measures including provide, via the HMI within the vehicle, visual and/or audio alerts to the driver of the vehicle, provide, via the external speaker, external audio and/or visual alerts, disable, via communication with the ADAS within the vehicle, operation of the vehicle, and send, via the wireless communication module, notification to a remote third party.

According to another aspect, when identifying an HPDL, the predictive module within the system controller is further adapted to probabilistically calculate, using historical data and a machine learning algorithm, the presence of an HPDL within the pre-determined proximity of the vehicle.

According to another aspect, the plurality of onboard sensors and the wireless communication module are adapted to collect data related to the presence of a high pedestrian density location (HPDL), including calendar events, concentrations of wireless devices, known points of interest, noise levels, and camera images, and collect data related to the proximity of the vehicle to the medium threat perimeter, the high threat perimeter and vehicle operating parameters, including vehicle speed, global navigation satellite system (GNSS) heading, and global positioning system (GPS) route guidance.

According to another aspect, the predictive module is adapted to identify a location as an HPDL if the predictive module receives, from remote third party calendar sources, data indicating that an event is taking place at the location, the predictive module receives data indicating that a density of wireless devices within the location exceeds a predetermined threshold, the predictive module receives, from an external microphone included within the plurality of onboard sensors, data that crowd noise levels measured within the area exceed a predetermined threshold, or the predictive module receives, from at least one camera included within the plurality of onboard sensors, images that, upon analysis by an image analysis algorithm within the system controller, include data indicating the presence of a crowd of pedestrians at the location.

According to another aspect, the predictive module is further adapted to establish a first threat level when a GNSS heading for the vehicle is not directed toward the HPDL, a speed of the vehicle exceeds a predetermined threshold, and the vehicle is not currently located within the medium threat perimeter, establish a second threat level when a GNSS heading for the vehicle is not directed toward the HPDL, a speed of the vehicle exceeds the predetermined threshold, and the vehicle is currently located within the medium threat perimeter, establish a third threat level when a GNSS heading for the vehicle is directed toward the HPDL, a speed of the vehicle exceeds the predetermined threshold, and the vehicle is not currently located within the medium threat perimeter, establish a fourth threat level when a GNSS heading for the vehicle is directed toward the HPDL, a speed of the vehicle exceeds the predetermined threshold, and the vehicle is currently located within the medium threat perimeter, and, establish a fifth threat level when a GNSS heading for the vehicle is directed toward the HPDL, a speed of the vehicle exceeds the predetermined threshold, and the vehicle is currently located within the high threat perimeter.

According to another aspect, the predictive module is adapted to initiate no counter measures when the first threat level or second threat level has been established, initiate counter measures including providing, via the HMI within the vehicle, visual and/or audio alerts to the driver of the vehicle when the third threat level has been established, initiate counter measures including provide visual and/or audio alerts to the driver of the vehicle, and limit, via communication with the ADAS within the vehicle, a maximum speed of the vehicle to a first predetermined speed limit when the fourth threat level has been established, and initiate countermeasures including provide visual and/or audio alerts to the driver of the vehicle, limit a maximum speed of the vehicle to a second predetermined speed limit, provide external audio and/or visual alerts, and send, via the wireless communication module, notification to a remote third party when the fifth threat level has been established.

According to another aspect, the predictive module within the system controller is adapted to define a size and shape of the medium threat perimeter and a size and shape of the high threat perimeter based on data related to a density pattern of pedestrians within the HPDL, continuously monitor the density pattern of the pedestrians within the HPDL, and continuously, on a periodic basis, update the size and shape of the medium threat perimeter and the size and shape of the high threat perimeter.

According to another aspect, when providing external audio and/or visual alerts, the system controller is adapted to display, via an external display of the vehicle, external visual alerts.

According to another aspect, when providing external audio and/or visual alerts, the system controller is adapted to send alerts to wireless devices of the pedestrians within the H PDL.

According to several aspects of the present disclosure, a method for detection and prevention of improper usage of a vehicle includes collecting, with a plurality of onboard sensors and a wireless communication module, each in communication with a system controller, data related to the presence of a high pedestrian density location (HPDL) within a pre-determined proximity of the vehicle, and identifying, with a predictive module within the system controller, an HPDL, and, when an HPDL is identified, with the predictive module, defining a medium threat perimeter around the HPDL, defining a high threat perimeter around the HPDL, establishing a threat level based on proximity of the vehicle to the medium threat perimeter and the high threat perimeter and vehicle operating parameters, and initiating counter measures based on the threat level, including at least one of providing, via a human machine interface (HMI) within the vehicle, visual and/or audio alerts to a driver of the vehicle, providing, via an external speaker, external audio and/or visual alerts, limiting, via communication with an advanced driver assistance system (ADAS) within the vehicle, a maximum speed of the vehicle, and sending, via the wireless communication module, notification to a remote third party.

According to another aspect, the method further includes determining, with a reactive module within the system controller, that the vehicle is being used improperly upon the occurrence of any one of detecting, with impact detection sensors within the vehicle, multiple impacts, actuating of a pedestrian protection algorithm within the system controller, detecting, with the system controller, via an external microphone, sounds that indicate distress of pedestrians within proximity of the vehicle, or detecting, with the impact detection sensors within the vehicle, a single impact with a pedestrian, and determination, by the system controller, based on data from a driver monitoring system, that the driver is actively and intentionally controlling the vehicle, and upon determination that the vehicle is being used improperly, initiating, with the reactive module, counter measures including providing, via the HMI, visual and/or audio alerts to the driver of the vehicle, providing, via the external speaker, external audio and/or visual alerts, disabling, via communication with the ADAS within the vehicle, operation of the vehicle, and sending, via the wireless communication module, notification to a remote third party.

According to another aspect the identifying, with the predictive module, the HPDL further includes probabilistically calculating, using historical data and a machine learning algorithm, the presence of the HPDL within the pre-determined proximity of the vehicle.

According to another aspect, the collecting, with the plurality of onboard sensors and the wireless communication module, data related to the presence of the HPDL within the pre-determined proximity of the vehicle further includes collecting data related to the presence of the HPDL, including calendar events, concentrations of wireless devices, known points of interest, noise levels, and camera images, and collecting data related to the proximity of the vehicle to the medium threat perimeter, the high threat perimeter and vehicle operating parameters, including vehicle speed, global navigation satellite system (GNSS) heading, and global positioning system (GPS) route guidance.

According to another aspect, the identifying, with the predictive module, the HPDL further includes identifying a location as an HPDL if the predictive module receives, from remote third-party calendar sources, data indicating that an event is taking place at the location, the predictive module receives data indicating that a density of wireless devices within the location exceeds a predetermined threshold, the predictive module receives, from an external microphone included within the plurality of onboard sensors, data that crowd noise levels measured within the area exceed a predetermined threshold, or the predictive module receives, from at least one camera included within the plurality of onboard sensors, images that, upon analysis by an image analysis algorithm within the system controller, include data indicating the presence of a crowd of pedestrians at the location.

According to another aspect, the establishing a threat level with the predictive module further includes establishing a first threat level when a GNSS heading for the vehicle is not directed toward the HPDL, a speed of the vehicle exceeds a predetermined threshold, and the vehicle is not currently located within the medium threat perimeter, establishing a second threat level when, a GNSS heading for the vehicle is not directed toward the HPDL, a speed of the vehicle exceeds the predetermined threshold and the vehicle is currently located within the medium threat perimeter, establishing a third threat level when a GNSS heading for the vehicle is directed toward the HPDL, a speed of the vehicle exceeds the predetermined threshold and the vehicle is not currently located within the medium threat perimeter, establishing a fourth threat level when a GNSS heading for the vehicle is directed toward the HPDL, a speed of the vehicle exceeds the predetermined threshold and the vehicle is currently located within the medium threat perimeter, and, establishing a fifth threat level when a GNSS heading for the vehicle is directed toward the HPDL, a speed of the vehicle exceeds the predetermined threshold, and the vehicle is currently located within the high threat perimeter.

According to another aspect, the initiating, with the predictive module, counter measures based on the threat level further includes initiating no counter measures when the first threat level or second threat level has been established, initiating counter measures including providing, via the HMI within the vehicle, visual and/or audio alerts to the driver of the vehicle when the third threat level has been established, initiating counter measures including providing visual and/or audio alerts to the driver of the vehicle, and limiting via communication with the ADAS within the vehicle, a maximum speed of the vehicle to a first predetermined speed limit when the fourth threat level has been established, and initiating counter measures including providing visual and/or audio alerts to the driver of the vehicle, limiting a maximum speed of the vehicle to a second predetermined speed limit, providing external audio and/or visual alerts, and sending, via the wireless communication module, notification to a remote third party when the fifth threat level has been established.

According to another aspect, the defining the medium threat perimeter around the HPDL and the defining the high threat perimeter around the HPDL further includes defining a size and shape of the medium threat perimeter and a size and shape of the high threat perimeter based on data related to a density pattern of pedestrians within the HPDL, continuously monitoring the density pattern of the pedestrians within the HPDL, and continuously, on a periodic basis, updating the size and shape of the medium threat perimeter and the size and shape of the high threat perimeter.

According to another aspect, the providing external audio and/or visual alerts further includes displaying, via an external display of the vehicle, external visual alerts, and sending alerts to wireless devices of the pedestrians within the HPDL.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a schematic diagram of a vehicle including a system according to an exemplary embodiment of the present disclosure;

Figure 2:
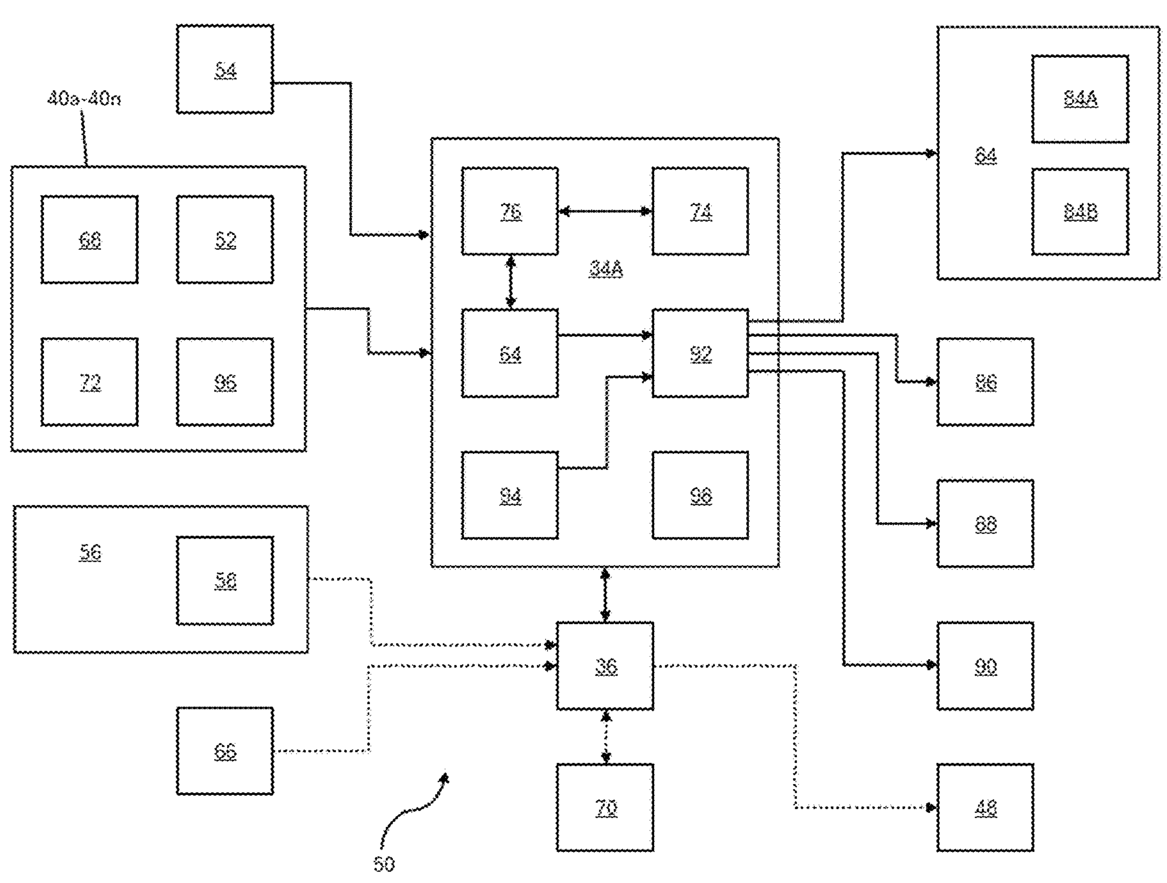
FIG. 2 is a schematic diagram of the system.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about", with reference to percentages, comprises a variation of plus/minus 5%, "about", with reference to temperatures, comprises a variation of plus/minus five degrees, and "about", with reference to distances, comprises plus/minus 10%. In addition, disclosure of ranges includes disclosure of all values and further divided ranges within the entire range, including endpoints and sub-ranges given for the ranges. In addition, disclosure of ranges includes disclosure of all values and further divided ranges within the entire range, including endpoints and sub-ranges given for the ranges.

Figure 1:
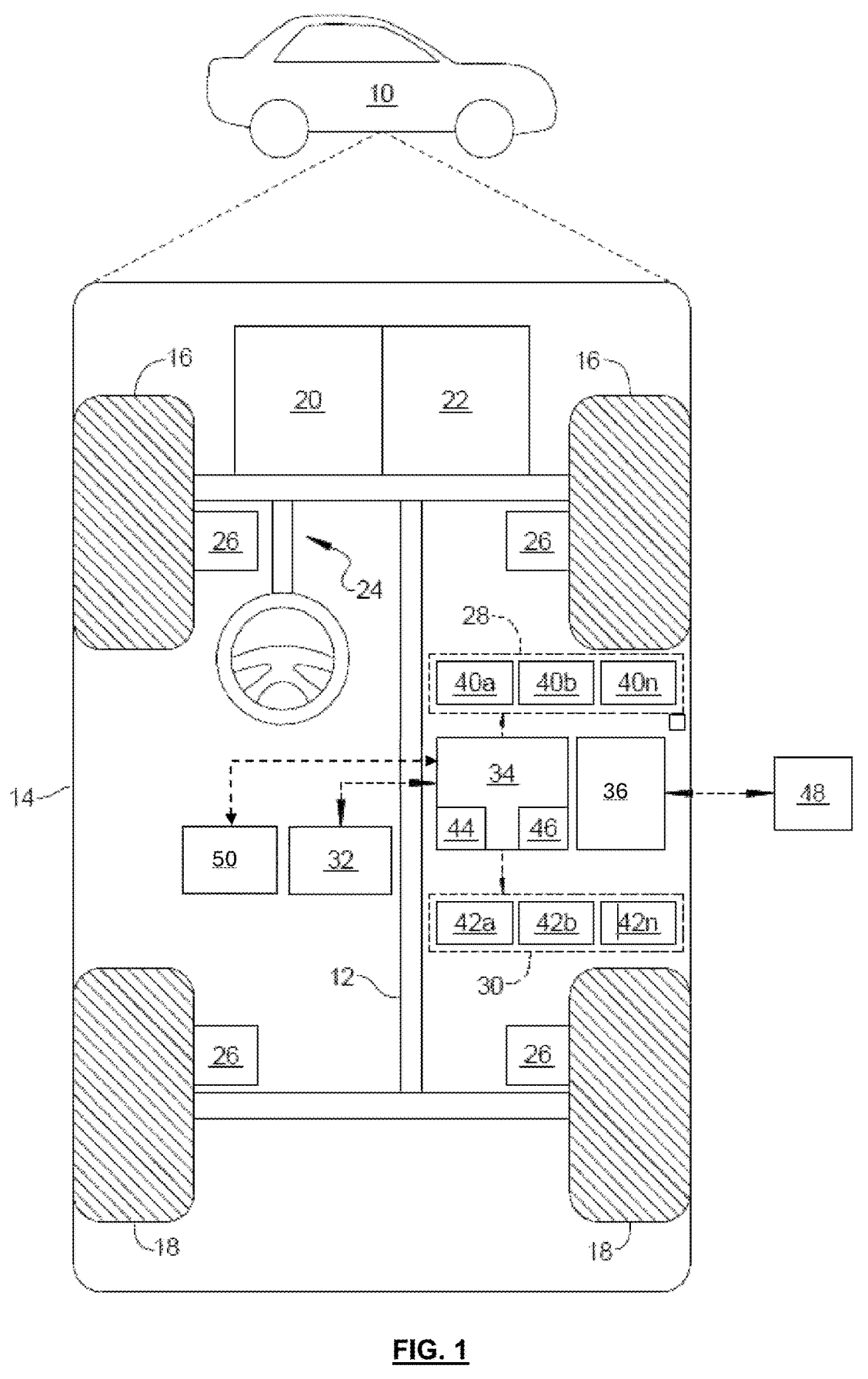

Example embodiments will now be described more fully with reference to the accompanying drawings. In accordance with an exemplary embodiment, FIG. 1 shows a vehicle 10 with an associated system 50 adapted to detect improper usage of the vehicle and implement counter measures adapted to prevent further improper usage of the vehicle 10. Improper usage may be any action that places the vehicle 10 in a position that may lead to a collision with pedestrians or has already caused the vehicle 10 to collide with a pedestrian. Further, improper usage of the vehicle 10 is action that is intentionally taken by a driver of the vehicle 10, as opposed to inadvertent action or lack of attention that may lead to a collision.

Many vehicles are equipped with an advanced driver assistance system (ADAS) that is equipped to intervene in certain circumstances, taking over control of specific vehicle 10 function to keep the vehicle 10 on an appropriate trajectory. Generally, ADAS is adapted to intervene only when an action of the vehicle 10, such as drifting toward a lane marker of a lane within which the vehicle 10 is traveling, appears to be unintended by the driver. ADAS inhibit software prevents the ADAS from intervening in circumstances where a driver is actively controlling the vehicle 10. Improper usage of a vehicle 10 is when a driver actively controls the vehicle in a manner that may or already has resulted in a collision with a pedestrian.

The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 50 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human user does not respond appropriately to a request to intervene. A Level Five system indicates "full automation", referring to the full-time performance by an automated driving system of all aspects of the dynamic driving task under all roadway and environmental conditions that can be managed by a human driver. The novel features of the present disclosure are applicable to autonomous vehicle having level 0-4 automation. In such an autonomous vehicle, the system 50 of the present disclosure would only function when the vehicle 10 is being operated in a manual mode (non-autonomous), wherein the driver is in control of all aspects of driving the vehicle 10.

As shown, the vehicle 10 generally includes a propulsion system 20, a transmission system 22, a steering system 24, a brake system 26, a sensor system 28, an actuator system 30, at least one data storage device 32, a vehicle controller 34, and a wireless communication module 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, such as for a fully autonomous vehicle, the steering system 24 may not include a steering wheel.

The sensor system 28 includes one or more sensing devices 40*a*-40*n* that sense observable conditions of the exterior environment and/or the interior environment of the autonomous vehicle 10. The sensing devices 40*a*-40*n* can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40*a*-40*n* includes at least one camera 52 adapted to see and interpret objects near the vehicle 10 just like human drivers do with their eyes. Typically, video cameras are positioned around the automobile at every angle to maintain a three-hundred and sixty degree view around the vehicle 10 and providing a broader picture of the environment around the vehicle 10. The at least one camera 52 is adapted to display highly detailed and realistic images, and automatically detect objects, such as other cars, pedestrians, cyclists, traffic signs and signals, road markings, bridges, and guardrails, classify them, and determine the distances between them and the vehicle 10.

In an exemplary embodiment, the plurality of sensing devices 40*a*-40*n* includes at least one of a motor speed sensor, a motor torque sensor, an electric drive motor voltage and/or current sensor, an accelerator pedal position sensor, a brake pedal position sensor, a coolant temperature sensor, a cooling fan speed sensor, and a transmission oil temperature sensor. In another exemplary embodiment, the plurality of sensing devices 40*a*-40*n* further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40*a*-40*n* is capable of measuring distances in the environment surrounding the vehicle 10.

The sensor system 28 communicates with a driver monitoring system 54. The driver monitoring system 54 within the vehicle 10 is adapted to monitor behavior of the driver of the vehicle 10. Driver-monitoring systems typically use a driver-facing camera equipped with infrared light-emitting diodes (LEDs) or lasers so that it can "see" the driver's face, even at night, and see the driver's eyes even if the driver is wearing dark sunglasses. Advanced on-board software collects data points from the driver and creates an initial baseline of what the driver's normal, attentive state looks like. The software can then determine whether the driver is blinking more than usual, whether the eyes are narrowing or closing, and whether the head is tilting at an odd angle. It can also determine whether the driver is looking at the road ahead, and whether the driver is actually paying attention or just absent-mindedly staring. The driver monitoring system 54 uses cameras and sensors to monitor behaviors of the driver including, but not limited to eye gaze behavior/patterns, body posture and hand locations. The driver monitoring system 54 may further monitor physiological characteristics of the driver such as, but not limited to, heartrate, respiration, galvanic skin response, EEG and skin temperature.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as P ROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the vehicle controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the vehicle controller 34 are embodied in a trajectory planning system and, when executed by the at least one data processor 44, using a global network satellite system (GNSS) 56 and a global positioning system (GPS) 58, generates a trajectory output that addresses kinematic and dynamic constraints of the environment. For example, the instructions receive as input process sensor and map data.

The wireless communication module 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (RO M), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Referring to FIG. 2, the system 50 for detection and prevention of improper usage of the vehicle 10 includes a system controller 34A that receives data from the plurality of onboard sensors 40*a*-40*n* and the wireless communication module 36. The system controller 34A may be the vehicle controller 34, or may be a separate controller in communication with the vehicle controller 34 and other sub-systems within the vehicle 10. The system controller 34A collects data related to the presence of a high pedestrian density location (H PDL) 60 within a pre-determined proximity of the vehicle. An H PDL may be any location that has, or is likely to have, a large group of pedestrians 62 present. Such locations may include an event, such as a concert, or a political gathering/speech, parade, farmer's market, etc. Such locations are a target to a driver who may intend to use a vehicle 10 improperly due to the concentration of pedestrians 62 present.

The system controller 34A includes a predictive module 64 that is adapted to use the data received from the plurality of sensors 40*a*-40*n* and from the wireless communication module 36 to identify an HPDL 60. Such data may include calendar events or event notifications from on-line and/or social media sources 66 including websites for known points of interest and/or third-party apps. Such data may further include information received via communication with devices owned by pedestrians allowing the system controller 34A and the predictive module 64 to estimate a density of the pedestrians at a location based on the number of wireless devices detected at that location. Data collected by the plurality of onboard sensors 40*a*-40*n* may include data related to the level of noise being generated by pedestrians at a a location and/or camera images (visual camera 52, infrared camera 68) and non-visual sensors (radar, lidar) that detect the presence of objects in front of the vehicle 10 and within images collected by camera 52, 68.

For a location to be deemed an HPDL 60 by the system controller 34A and the predictive module 64, the location must be within a predetermined proximity to the vehicle 10. The predetermined proximity is a distance at which the location is close enough to the vehicle 10 to be relevant, and potentially a location that is being targeted by a driver of the vehicle 10. Thus, the system controller 34A and the predictive module 64 are receiving data identifying locations that have, or are likely to have a high concentration of pedestrians, and are close enough to the vehicle 10, within the predetermined proximity to the vehicle 10, that they are relevant, and thus, potentially an HPDL 60.

In an exemplary embodiment, the predictive module 64 is adapted to identify a location as an HPDL 60 based on multiple factors, one or more of which may provide sufficient evidence for the predictive module 64 to classify a location as an HPDL 60. As discussed above, the system controller 34A and the predictive module 64 receive data from remote sources 66 via the wireless communication module 36. For example, the vehicle 10 is approaching a roadside park which is within the predetermined proximity, by way of non-limiting example, one half mile. If the predictive module 64 receives data, via the wireless communication modules, from a website advertising an event, such as a free concert, at the roadside park that day, the predictive module 64 will identify the roadside park as an HPDL 60. Additional data may bolster or counter determination, by the predictive module 64, that the location is an HPDL. Building on the example above, if the predictive module 64 receives additional information, such as that the concert was set for 12:00 noon, was scheduled to go for two hours, and it is now 5:00 pm, the predictive module 64 may determine that the location is NOT an HPDL 60. The system controller 34A and the predictive module 64 will continue to collect data related to any identified or potential HPDL 60 for as long as such location falls within the predetermined proximity of the vehicle 10 to continuously re-evaluate the location.

As discussed above, the system controller 34A and the predictive module 64 receive data via communication, with the wireless communication module 36, with wireless devices 70 owned by pedestrians within the predetermined proximity of the vehicle 10. The predictive module 64 will determine that a location is a HPDL 60 is the density of wireless devices detected at a location exceeds a predetermined threshold. For example, the vehicle 10 is approaching a roadside park that is within the predetermined proximity to the vehicle 10, and the predictive module 64 identifies three wireless devices 70 that are active at the park. The predetermined threshold for wireless devices 70 is, by way of non-limiting example, twenty-five wireless devices within an area that is one thousand square feet. Thus, in this example, since there are only three wireless devices identified at the park, the predictive module 64 will not identify the park as an HPDL 60. However, if the number of wireless devices 70 identified at the park exceeds twenty-five, then the predictive module 64 will identify the park as an H PDL 60.

The system controller 34A and the predictive module 64 are further adapted to receive data from an external microphone 72 adapted to pick up noise levels within the predetermined proximity of the vehicle 10. If noise levels are high enough, and determined to be from pedestrians at a location, the predictive module 64 will identify the location as a HPDL 60. For example, as the vehicle 10 approaches a roadside park the external microphone 72 picks up noise from a crowd of pedestrians 62. The system controller 34A includes algorithms adapted to distinguish noise caused by construction or a thunderstorm or traffic, from noise generated by a group of pedestrians 62. Thus, if the noise is determined to be generated by a group of pedestrians 62, and if the level of the noise is above a predetermined threshold, indicating that the group of pedestrians 62 is of sufficient size, the predictive module 64 will determine that the roadside park is an HPDL 60.

As discussed above, the system controller 34A and the predictive module 64 receive data from at least one camera 52 adapted to capture images of the environment surrounding the vehicle 10. Thus, the system controller 34A and the predictive module 64 can "look" at a location in front of the vehicle 10 and "see" if the location should be identified as an HPDL 60. For example, the vehicle 10 is approaching a roadside park, and the at least one camera 52 captures images of a large group of pedestrians in front of a stage watching a free concert. Image analysis algorithms within the system controller 34A allow the system controller 34A and the predictive module 64 to determine that pedestrians 62 are present, and establish an estimate of how many pedestrians 62 are present based on the size of the group and by individually identifying and counting the pedestrians 62 within images captured by the at least one camera 52. the captured images. via communication, with the wireless communication module 36, with wireless devices 70 owned by pedestrians within the predetermined proximity of the vehicle 10. A predetermined threshold for density of pedestrians is, by way of non-limiting example, twenty-five pedestrians 62 within an area that is one thousand square feet. Thus, in this example, if analysis of the images indicated that more than twenty-five people are in the crowd, the predictive module 64 will identify the roadside parkas an HPDL 60.

In another exemplary embodiment, when identifying an HPDL 60, the predictive module 64 within the system controller 34A is further adapted to probabilistically calculate, using historical data stored within a database 74, and a machine learning algorithm 76, the presence of an HPDL 60 within the pre-determined proximity of the vehicle 10.

The system controller 34A includes a machine learning algorithm 76 that is adapted to predict the presence of an HPDL based on the real-time data related to the location and operating conditions (date, weather, time of day) of the vehicle 10 and data from the database 74. Various techniques are employed to extract meaningful features from sensor readings and data, including time-series analysis, frequency-domain analysis, and spatial-temporal patterns. The machine learning algorithm 76 may be one of, but not limited to, Long Short-Term Memory (LSTM), Gated Recurrent Unit (GRU), Decision Trees, Random Forests, Support Vector Machines (SVM), Neural Networks (NN), K-Nearest Neighbors (KNN), Gradient Boosting and Recurrent Neural Networks (RNN).

Thus, the system controller 34A uses the machine learning algorithm 76 and machine learning techniques to predict the presence of an HPDL 60 based on analyzing the real-time data of the location of the vehicle 10 and the operating conditions of the vehicle 10 in light of data received from the database 74 including past instances matching the current location and vehicle operating parameters.

Observation of patterns of a location being previously identified as an HPDL 60 allows the machine learning algorithm 76 to predict that such location is an HPDL 60 in the future. Each time a location is identified as an HPDL 60, or not an HPDL 60, that information is stored within the database 74. Thus, when the vehicle 10 approaches a location, by accessing the database 74, the machine learning algorithm can probabilistically calculate a probability that the location is an HPDL 60. For example, the vehicle approaches a roadside park, and over the past several years, each time the vehicle 10 passed the roadside park on a Saturday, a free concert with a large group of pedestrians 62 was taking place, and the predictive module 64 identified the roadside park as an HPDL 60. Thus, as the vehicle 10 approaches the roadside park, on a Saturday, the system controller 34A and the predictive module 64 pull data from the database 74, and, based on the past instances, the machine learning algorithm 76 predicts that the road side park is an HPDL 60 based on the past data.

A probabilistic calculation is based on statistical analysis of the data within the database 74. If the data within the database indicates that EVERY time the vehicle 10 passes the roadside park on a saturday, the roadside park is identified as an HPDL 60, then the machine learning algorithm 76 will probabilistically calculate a 100% chance that the road side park is an HPDL 60 if it is Saturday. The data stored within the database 74 is updated upon every instance of the vehicle 10 passing the roadside park, thus, the machine learning algorithm is constantly updated based on actual occurrences. Further, when the machine learning algorithm "predicts" that the roadside park is an HPDL 60, however, as the vehicle 10 gets closer, data from other sources confirm that the roadside park is NOT an HPDL 60, then the database 74 and the machine learning algorithm 76 are updated for more accurate predictions in the future.

Once the predictive module 64 within the system controller 34A identifies a location as an HPDL 60, the predictive module defines a medium threat perimeter 78 around the HPDL 60, defines a high threat perimeter 80 around the HPDL 60, and establishes a threat level based on proximity of the vehicle 10 to the medium threat perimeter 78 and the high threat perimeter 80, and vehicle 10 operating parameters, and initiates counter measures based on the threat level.

The location of the medium threat perimeter 78 and the high threat perimeter 80 are based on the principle that the system 50 is attempting to identify potential improper behavior of the vehicle 10, and the risk of such improper behavior increases as the vehicle gets closer to the HPDL 60. It should be understood that the predetermined proximity to the vehicle, the medium threat perimeter and the high threat perimeter discussed herein may be fluid, wherein, for example, the predetermined proximity to the vehicle, the medium threat perimeter and the high threat perimeter are calculated/controlled by other factors, such as the size of the HPDL 60, the number of pedestrians 62 within the HPDL 60, weather conditions, etc.

For example, on a dry and sunny day, the predetermined proximity to the vehicle 10, the medium threat perimeter 78 and the high threat perimeter 80 may be calculated/selected by the system controller 34A to be one-quarter mile, four-hundred feet and one-hundred feet respectively. Wherein, a location would have to be within one-quarter of a mile of the vehicle 10 to be an HPDL 60, the medium threat perimeter 78 is defined as a circle with the HPDL 60 located at the center of the circle, the circle having a radius of four-hundred feet, and the high threat perimeter 80 is defined as a circle, concentric with the medium threat perimeter and having a radius of one-hundred feet. However, if the weather is rainy, and roads are wet, the predetermined proximity to the vehicle 10, the medium threat perimeter 78 and the high threat perimeter 80 may be calculated/selected by the system controller 34A to be one-half mile, six-hundred feet and two-hundred feet respectively. The increase in the predetermined proximity to the vehicle 10, the medium threat perimeter 78 and the high threat perimeter 80 adapted to account for potentially slippery conditions, longer stopping distances, and accelerating established threat levels and initiated counter measures (discussed below) under such circumstances.

Further, it should be understood that although described as a circle above, the shape of the medium threat perimeter 78 and the high threat perimeter 80 may be customized to envelope the pedestrians present within the HPDL 60, and may be any suitable size or shape according to the HPDL 60, the pedestrians 62 within the H PDL 60 and the distribution of such pedestrians 62 within the HPDL 60.

In an exemplary embodiment, the predictive module 64 is adapted to define a size and shape of the medium threat perimeter 78 and a size and shape of the high threat perimeter 80 based on data related to a density pattern of pedestrians 62 within the HPDL 60, continuously monitor the density pattern of the pedestrians 62 within the HPDL 60, and continuously, on a periodic basis, update the size and shape of the medium threat perimeter 78 and the size and shape of the high threat perimeter 80.

The system controller 34A and the predictive module 64 collect, via the plurality of sensors 40*a*-40*n* and the wireless communication module 36, data related to the proximity of the vehicle 10 to the medium threat perimeter 78, the high threat perimeter 80 and vehicle operating parameters, including vehicle speed, heading data from a global navigation satellite system (GNSS) 56, and route guidance data from a global positioning system (GPS) 58.

Figure 3:
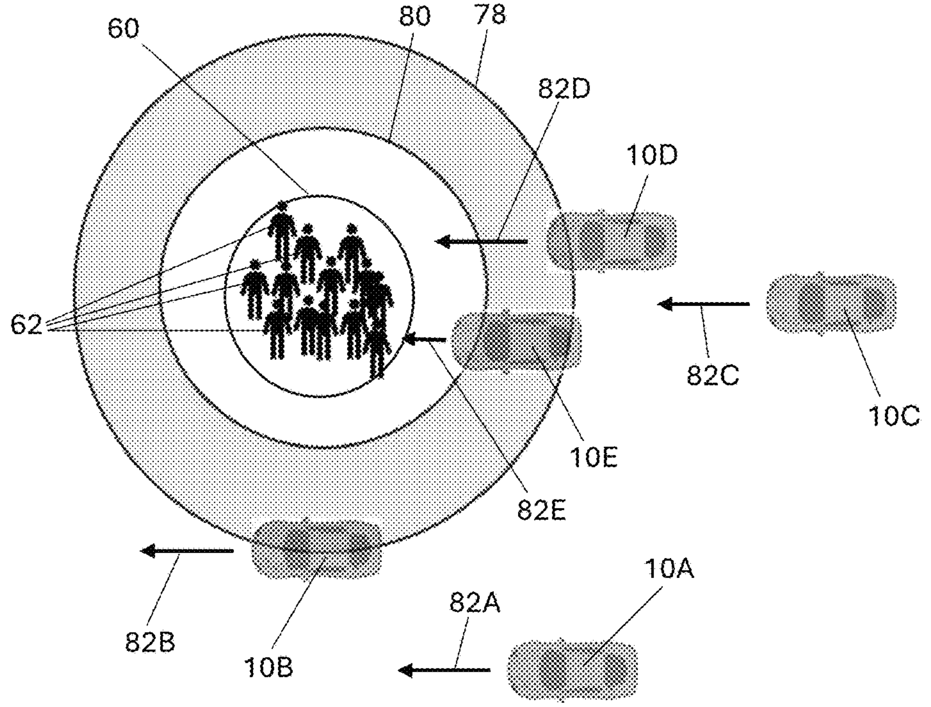
FIG. 3 is a schematic diagram illustrating a medium risk perimeter and a high risk perimeter of a high pedestrian density location (HPDL) and examples of a vehicle having a first threat level, a vehicle having a second threat level, a vehicle having a third threat level, a vehicle having a fourth threat level and a vehicle having a fifth threat level.

Referring to FIG. 3, in an exemplary embodiment, a first vehicle 10A is travelling relative to the HPDL 60, as indicated by arrow 82A. The predictive module 64 is adapted to establish a first threat level of "LOW" when a GNSS 56 heading, as indicated by arrow 82A for the vehicle 10A is not directed toward the HPDL 60, a speed of the vehicle 10A exceeds a predetermined threshold, meaning that the vehicle 10A is traveling at a speed that is faster than a driver should consciously be traveling when aware of nearby pedestrians 62 and fast enough to cause damage, and thus could be a realistic threat, and the vehicle 10A is not currently located within the medium threat perimeter 78. The predictive module 64 establishes the first threat level because the first vehicle 10A, while traveling fast enough to cause harm, is not currently within the medium threat perimeter 78 and is not currently moving toward the HPDL 60, and thus, does not appear to be a threat to the pedestrians 62 within the HPDL 60. When the predictive module 64 establishes the first threat level, the predictive module 64 initiates no counter measures.

Referring again to FIG. 3, in an exemplary embodiment, a second vehicle 10B is travelling relative to the HPDL 60, as indicated by arrow 82B. The predictive module 64 is adapted to establish a second threat level of "MEDIUM trending LOW" when a GNSS 56 heading, as indicated by arrow 82B for the vehicle 10B is not directed toward the HPDL 60, a speed of the vehicle 10B exceeds a predetermined threshold, meaning that the vehicle 10B is traveling fast enough to cause damage, and thus could be a realistic threat, and the vehicle 10B is currently located within the medium threat perimeter 78. The predictive module 64 establishes the second threat level because the vehicle 10B, while traveling fast enough to cause harm, and currently within the medium threat perimeter 78, is not currently moving toward the HPDL 60, and thus, does not appear to be a threat to the pedestrians 62 within the HPDL 60. When the predictive module 64 establishes the second threat level, the predictive module 64 initiates no counter measures.

Referring again to FIG. 3, in an exemplary embodiment, a third vehicle 10C is travelling relative to the HPDL 60, as indicated by arrow 82C. The predictive module 64 is adapted to establish a third threat level of "LOW trending MEDIUM" when a GNSS 56 heading, as indicated by arrow 82C for the vehicle 10C is directed toward the HPDL 60, a speed of the vehicle 10C exceeds a predetermined threshold, meaning that the vehicle 10C is traveling fast enough to cause damage, and thus could be a realistic threat, and the vehicle 10C is not currently located within the medium threat perimeter 78. The predictive module 64 establishes the third threat level because the vehicle 10C, while not currently within the medium threat perimeter 78, is traveling fast enough to cause harm, and currently headed toward the HPDL 60, and thus, could be a threat to the pedestrians 62 within the HPDL 60.

When the predictive module 64 establishes the third threat level, the predictive module 64 initiates counter measures including providing visual and/or audio alerts to the driver of the vehicle 10C via a human machine interface (HMI) 84 within the vehicle 10C. The HMI 84 facilitates communication between the driver within the vehicle 10C and the system controller 34A. The HMI 84 includes a display screen 84A adapted to display messages for the driver. The display screen 84A may be a touch screen display, providing the ability for a driver within the vehicle 10C to input information and preferences to the system controller 34A. The HMI 84 may further include an internal speaker 84B adapted to provide audible alerts and messages to the driver within the vehicle 10C, and a microphone, adapted to allow the driver to provide audible input to the system controller 34A.

Visual and audio alerts to the driver via the HMI 84 are intended to alert the driver to the potential risk and allow, if so desired, the driver to take action to alter the course and/or speed of the vehicle 10C to reduce any risk of collision with pedestrians in the HPDL 60.

Referring again to FIG. 3, in an exemplary embodiment, a fourth vehicle 10D is travelling relative to the HPDL 60, as indicated by arrow 82D. The predictive module 64 is adapted to establish a fourth threat level of "MEDIUM trending HIGH"" when a GNSS 56 heading, as indicated by arrow 82D for the vehicle 10D is directed toward the HPDL 60, a speed of the vehicle 10D exceeds a predetermined threshold, meaning that the vehicle 10D is traveling fast enough to cause damage, and thus could be a realistic threat, and the vehicle 10D is currently located within the medium threat perimeter 78. The predictive module 64 establishes the fourth threat level because the vehicle 10D, is currently within the medium threat perimeter 78, is traveling fast enough to cause harm, and is currently headed toward the HPDL 60, and thus, has a higher possibility of being a threat to the pedestrians 62 within the HPDL 60.

When the predictive module 64 establishes the fourth threat level, the predictive module 64 initiates counter measures including providing visual and/or audio alerts to the driver of the vehicle 10D via the HMI 84 within the vehicle 10D, and limiting, via communication with an automatic driver assistance system (ADAS) 86 within the vehicle 10D, a maximum speed of the vehicle 10D to a first predetermined speed limit. Visual and audio alerts to the driver via the HMI 84 are intended to alert the driver to the potential risk and allow, if so desired, the driver to take action to alter the course and/or speed of the vehicle 10D to reduce any risk of collision with pedestrians 62 in the HPDL 60. Limiting the maximum speed of the vehicle 10D takes some of that control away from the driver to reduce the potential for a collision, regardless of the driver's intentions.

When the predictive module 64 establishes the fourth threat level, the system controller 34A will disable inhibit software within the ADAS 86, enabling intervention by the system controller 34A, and intervene, by taking control of the vehicle propulsion system 20 to limit a maximum speed of the vehicle 10D.

ADAS systems are generally adapted to intervene and provide alerts and/or temporarily take over control of certain vehicle systems, such as brakes, propulsion (accelerator) and steering, when the system determines that the vehicle is operating in an inadvertent manner, such as drifting away from centerline of a roadway lane. ADAS systems include inhibit software that prevents the system from intervening when a driver takes deliberate action.

By way of a non-limiting example, an advanced driver assistance system (ADAS) is adapted to intervene during situations where the system determines intervention must occur to correct an action that may not be intended by the driver and/or the driver is not aware of, such as when a vehicle drifts away from center of a lane within which the vehicle 10 is travelling. ADAS features are included within and controlled by the vehicle controller 34. When a vehicle 10 begins to drift gradually toward an edge of the lane, the ADAS lane keeping assist features will alert a driver that the vehicle 10 is drifting, and may, in certain circumstances, temporarily take control of the steering wheel to bring the vehicle 10 back to center of the lane. ADAS inhibit software, as discussed above, blocks the system from taking control of vehicle systems when the action is perceived as intentional by the driver. Thus, if the driver deliberately moves the steering wheel to steer the vehicle toward the edge of the lane, the inhibit software will prevent the lane keeping assist features of the ADAS from intervening.

Therefore, when the predictive module 64 of the present system 50 establishes the fourth threat level, the system controller 34A disables any inhibit software present within the ADAS 86, allowing the predictive module 64 to initiate, via the ADAS 86, counter measures limiting the maximum speed of the vehicle 10D, even if other systems within the vehicle 10D, such as the driver monitoring system 54, indicate that current operating parameters of the vehicle 10D are being intentionally controlled by the driver.

The first predetermined speed limit is a speed that is intended to reduce the risk of collision with pedestrians 62 in the HPDL 60 and, in the event of a collision, to reduce the severity of such collision. In an exemplary embodiment, the first predetermined speed limit is forty-five mile per hour, or thirty miles per hour. It should be understood that the speed limit thresholds discussed herein may be fluid, wherein, for example, the first predetermined speed limit is calculated/controlled by other factors, such as the size of the HPDL 60, the number of pedestrians 62 within the HPDL 60, weather conditions, etc. For example, on a sunny day, the first predetermined speed limit may be calculated/selected by the system controller 34A to be forty-five miles per hour, however, if the weather is rainy, and roads are wet, the first predetermined speed limit may be calculated/selected by the system controller 34A to be thirty miles per hour, accounting for longer stopping distances, and, if the weather is snowy, and the roads are icy, the first predetermined speed limit may be calculated/selected by the system controller 34A to be twenty miles per hour.

Referring again to FIG. 3, in an exemplary embodiment, a fifth vehicle 10E is travelling relative to the HPDL 60, as indicated by arrow 82E. The predictive module 64 is adapted to establish a fifth threat level of "HIGH"" when a GNSS 56 heading, as indicated by arrow 82E for the vehicle 10E is directed toward the HPDL 60, a speed of the vehicle 10E exceeds a predetermined threshold, meaning that the vehicle 10E is traveling fast enough to cause damage, and thus could be a realistic threat, and the vehicle 10E is currently located within the high threat perimeter 80. The predictive module 64 establishes the fifth threat level because the vehicle 10E, is currently within the high threat perimeter 80, is traveling fast enough to cause harm, and is currently headed toward the HPDL 60, and thus, has a very high possibility of being a threat to the pedestrians 62 within the HPDL 60.

When the predictive module 64 establishes the fifth threat level, the predictive module 64 initiates counter measures including providing visual and/or audio alerts to the driver of the vehicle 10E via the HMI 84 within the vehicle 10E, and limiting, via communication with the ADAS 86 within the vehicle 10E, a maximum speed of the vehicle 10D to a second predetermined speed limit. Further, the predictive module 64 provides external audio and/or visual alerts, and sends, via the wireless communication module 36, notification to a remote third party 48, such as police or emergency services. Visual and audio alerts to the driver via the HMI 84 are intended to alert the driver to the potential risk and allow, if so desired, the driver to take action to alter the course and/or speed of the vehicle 10D to reduce any risk of collision with pedestrians 62 in the HPDL 60. Limiting the maximum speed of the vehicle 10D takes some of that control away from the driver to reduce the potential for a collision, regardless of the driver's intentions.

When the predictive module 64 establishes the fifth threat level, the system controller 34A will disable inhibit software within the ADAS 86, enabling intervention by the system controller 34A, and intervene, by taking control of the vehicle propulsion system 20 to limit a maximum speed of the vehicle 10E. The second predetermined speed limit is much less than the first predetermined speed limit, due to the increased likelihood and severity of collision with pedestrians in the HPDL 60. In an exemplary embodiment, the second predetermined speed limit is five miles per hour, and slow enough to dramatically reduce the risk of collision. The second predetermined speed limit, as described above for the first predetermined speed limit, may be fluid and calculated/selected based on vehicle operating parameters and environmental conditions.

In addition, the predetermined threshold for the speed of the vehicle 10 that must be exceeded before any of the first, second, third, fourth and fifth threat levels is established is a speed that is high enough that substantial damage and/or injury is likely in the event of an collision with a pedestrian 62. By way of non-limiting example, in an exemplary embodiment, the predetermined threshold for the speed of the vehicle 10 that must be exceeded before a threat level is established is forty-five miles per hour.

It should be understood that the predetermined threshold for the speed of the vehicle 10 that must be exceeded before establishing a threat level may be fluid, wherein, for example, the predetermined threshold is calculated/controlled by other factors, such as weather conditions, etc. For example, on a sunny day, the predetermined threshold for the speed of the vehicle 10 that must be exceeded before establishing a threat level may be calculated/selected by the system controller 34A to be forty-five miles per hour, however, if the weather is rainy, and roads are wet, the predetermined threshold for the speed of the vehicle 10 that must be exceeded before establishing a threat level may be calculated/selected by the system controller 34A to be less than forty-five miles per hour, accounting for longer stopping distances, lower visibility, etc.

External audio alerts are provided by an external speaker 88 (audio speaker or vehicle horn) adapted to broadcast audio content (verbal language and/or horn/siren alert) to pedestrians 62 near the vehicle 10E and within the HPDL 60. External visual alerts are provided by an external display 90 adapted to provide alerts to pedestrians 62 near the vehicle 10E and within the HPDL 60 that are visible to such pedestrians 62. The external display 90 may include a display screen, or may include utilization of other vehicle systems, such as, by way of non-limiting example, the vehicle headlights and tail-lights, wherein the external visual alert includes flashing the headlights and/or tail-lights of the vehicle 10E. The predictive module 64 sends notification to a remote third party 48, such as police or emergency services, to notify them of the conditions and behavior that lead to the fifth threat level determination by the predictive module 64.

In another exemplary embodiment, when providing external audio and/or visual alerts, the system controller 34A and the predictive module 64 are adapted to send alerts to wireless devices 70 of the pedestrians 62 within the HPDL 60.

In an exemplary embodiment, the system controller 34A includes a response module 92 adapted to receive data from the predictive module 64 and determine appropriate content for initiated counter measures. For example, when the predictive module 64 initiates counter measures including audio and visual alerts for the driver, the response module 92 includes speech algorithms adapted to formulate verbal alerts to be broadcast to the driver via the internal speaker 84B of the HMI 84, and an image generation engine adapted to generate images to be displayed for the driver on the display screen 84A of the HMI 84.

In an exemplary embodiment, the system 50 further includes a reactive module 94 within the system controller 34A and adapted to determine that the vehicle 10 is being used improperly upon the occurrence of determination, by the system controller 34A and the reactive module 92, based on data from the driver monitoring system 54, that the driver is actively and intentionally controlling the vehicle 10 in a purposeful manner and when any one of a plurality of conditions exist.

In an exemplary embodiment, the reactive module 92 will determine that the vehicle 10 is being used improperly when the driver is acting intentionally and upon detection, by impact detection sensors 96 within the vehicle 10, of multiple impacts. Generally, when a driver of a vehicle 10 experiences a collision of any kind, the driver will stop to investigate damage to the vehicle 10, damage to whatever they collided with, etc. Detection of multiple impacts is an indication that the driver, even after the first impact, did not stop and continued until at least one more impact occurred. This behavior is indicative that the driver may be acting improperly, with an intent to cause such impacts and corresponding damage.

In an exemplary embodiment, the reactive module 92 will determine that the vehicle 10 is being used improperly when the driver is acting intentionally and upon actuation of a pedestrian protection algorithm 98 within the system controller 34A. The pedestrian protection algorithm 98 is part of a pedestrian protection system that contributes to mitigating an impact between a pedestrian and the vehicle 10 in certain frontal collisions. Sensors in the front of the vehicle react and the system is activated in certain frontal collisions with a pedestrian. Pedestrian protection systems include systems and design features in the front of the vehicle 10 adapted to minimize injuries to a pedestrian that is hit by the vehicle 10. The actuation of a pedestrian protection system, indicating an impact with a pedestrian 62, along with indication that the driver was acting intentionally is an indication that the driver of the vehicle is intentionally, and with purpose, using the vehicle improperly.

In an exemplary embodiment, the reactive module 92 will determine that the vehicle 10 is being used improperly when the driver is acting intentionally and upon detection, by the system controller 34A, via the external microphone 72, sounds that indicate distress of pedestrians 62 within proximity of the vehicle 10. Sound analysis algorithms within the system controller 34A are adapted to parse collected audio data and identify sounds that indicate distress (screaming, crying, yelling and specific language). For example, the external speaker 72 may pick up high pitched screaming of "Yay! Faster, faster!", which the sound analysis algorithms would identify as happy sounds, potentially of children playing. The detection of other background happy sounds would affirm this analysis. Alternatively, the external speaker 72 may pick up high volume adult voiced screams of "Run! He's out of control!", which the sound analysis algorithms would identify as potentially distressed cries from scared pedestrians 62. The sound analysis algorithm uses data stored therein of exampled of sounds indicating distress, fear, panic, etc. By comparing collected audio data to known samples, the sound analysis algorithm can accurately determine when collected sounds are due to distress of pedestrians 62. The identification of such sounds, along with indication that the driver was acting intentionally is an indication that the driver of the vehicle 10 is intentionally, and with purpose, using the vehicle improperly.

In an exemplary embodiment, the reactive module 92 will determine that the vehicle 10 is being used improperly when the driver is acting intentionally and upon detection, by impact detection sensors 96 within the vehicle 10, of a single impact with a pedestrian 62. The impact detection sensors 96 can detect the impact, and using data from the at least one camera 52, the reactive module 94 can determine that an impact, no matter how slight, was with a pedestrian 62. The identification of such an impact, along with indication that the driver was acting intentionally is an indication that the driver of the vehicle 10 is intentionally, and with purpose, using the vehicle improperly.

It should be understood that the determination, by the reactive module 94, that the vehicle 10 is being used improperly may be based on a probabilistic calculation of a probability that the driver is intentionally, and with purpose, using the vehicle 10 improperly. When making such calculations, the reactive module 94 will monitor all conditions, wherein any single one of the conditions described above may be an indication that the vehicle 10 is being used improperly, the occurrence of multiple ones of such conditions (detection of an impact with a pedestrian and audio data of distressed pedestrians) provides increased confidence in a determination by the reactive module 94 that the vehicle 10 is being used improperly. Further, machine learning algorithms, using provided data of examples of vehicles being used improperly, can be used to make more accurate determinations of when a vehicle 10 is being used improperly.

Upon determination that the vehicle 10 is being used improperly, the reactive module 94 is adapted to initiate counter measures including providing, via the HMI 84 within the vehicle 10, visual and/or audio alerts to the driver of the vehicle 10, as discussed above, and providing, via the external speaker 88 and external display 90, external audio and/or visual alerts, as described above.

In addition, upon determination that the vehicle 10 is being used improperly, the reactive module 94 is adapted to disable, via communication with the ADAS 86 within the vehicle 10, operation of the vehicle 10, and send, via the wireless communication module 36, notification to a remote third party 48, such as police and/or emergency services. At the point the reactive module determines a driver of a vehicle is intentionally using the vehicle improperly, intending to cause harm, the reactive module 94, via the response module 92, takes steps to completely remove the driver's ability to continue such improper usage by shutting the vehicle 10 down and notifying authorities.

Figure 4:
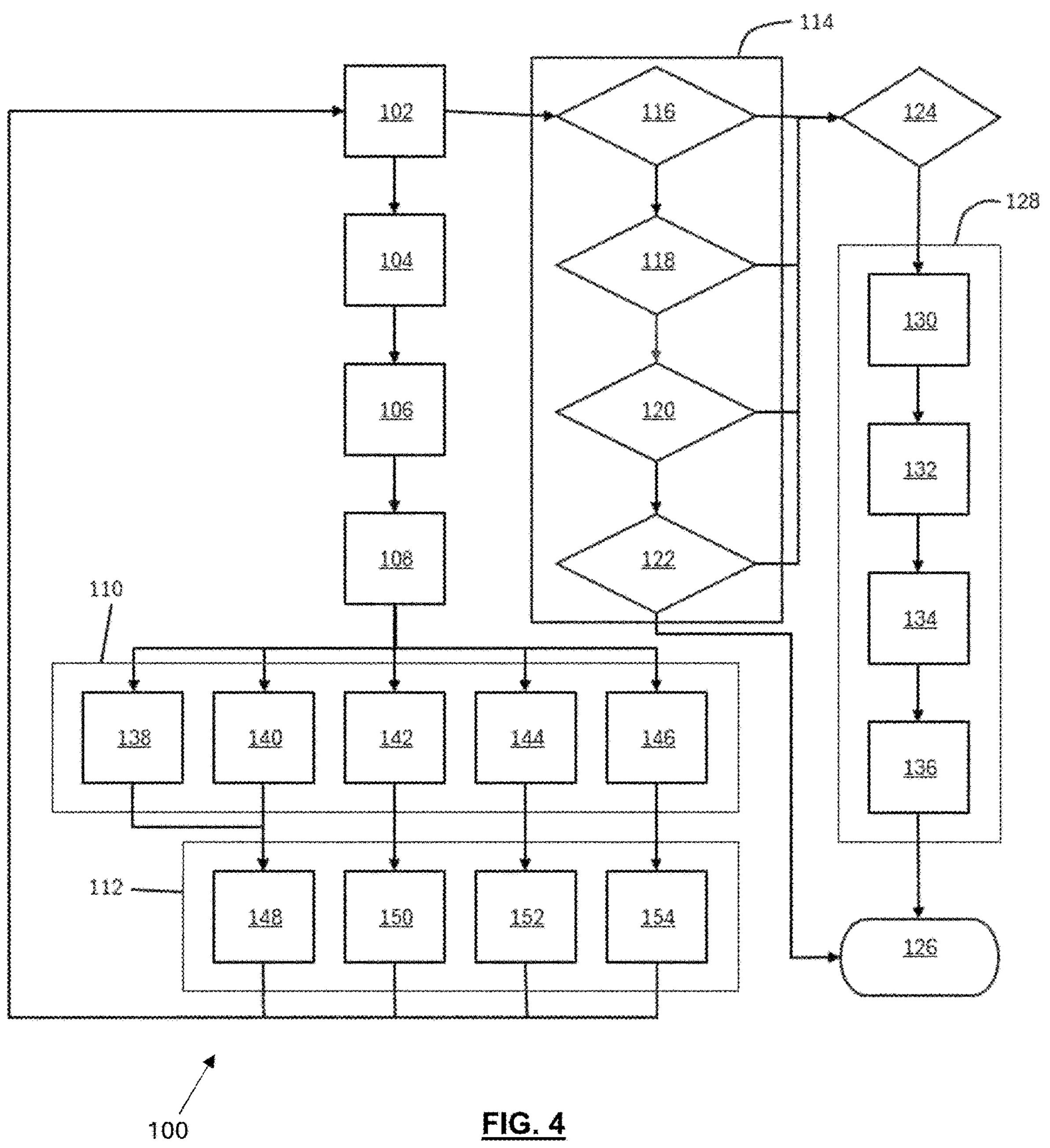
FIG. 4 is a flow chart illustrating a method of operating the system of FIG. 2 in accordance with an exemplary embodiment of the present disclosure.

Referring to FIG. 4, a method 100 for detection and prevention of improper usage of a vehicle 10 includes, beginning at block 102, collecting, with a plurality of onboard sensors 40*a*-40*n* and a wireless communication module 36, each in communication with a system controller 34A, data related to the presence of a high pedestrian density location (HPDL) 60 within a pre-determined proximity of the vehicle 10, moving to block 104, and identifying, with a predictive module 64 within the system controller 34A, an HPDL 60, and, when an HPDL 60 is identified, with the predictive module 64, moving to block 106, defining a medium threat perimeter 78 around the HPDL 60, moving to block 108, defining a high threat perimeter 80 around the HPDL 60, moving to block 110, establishing a threat level based on proximity of the vehicle 10 to the medium threat perimeter 78 and the high threat perimeter 80, and vehicle operating parameters, and, moving to block 112, initiating counter measures based on the threat level, including at least one of providing, via a human machine interface (HMI) 84 within the vehicle 10, visual and/or audio alerts to a driver of the vehicle 10, providing, via an external speaker 88, external audio and/or visual alerts, limiting, via communication with an advanced drive assistance system (ADAS) 86 within the vehicle 10, a maximum speed of the vehicle 10, and sending, via the wireless communication module 36, notification to a remote third party 48.

In an exemplary embodiment, the method 100 further includes, moving from block 102 to block 114, determining, with a reactive module 94 within the system controller 34A, that the vehicle 10 is being used improperly upon the occurrence of, moving to block 116, detecting, with impact detection sensors 96 within the vehicle 10, multiple impacts, and moving to block 124, determination, by the system controller 34A, based on data from a driver monitoring system 54, that the driver is actively and intentionally controlling the vehicle 10.

If multiple impacts are not detected at block 116, then, the method 100 further includes, moving from block 116 to block 118, determining, with the reactive module 94 within the system controller 34A, that the vehicle 10 is being used improperly upon the occurrence of actuating of a pedestrian protection algorithm 98 within the system controller 34A, and, moving to block 124, determination, by the system controller 34A, based on data from a driver monitoring system 54, that the driver is actively and intentionally controlling the vehicle 10.

If a pedestrian protection algorithm 98 has not been actuated at block 118, then, the method 100 further includes, moving from block 118 to block 120, determining, with the reactive module 94 within the system controller 34A, that the vehicle 10 is being used improperly upon the occurrence of detecting, with the system controller 34A, via an external microphone 72, sounds that indicate distress of pedestrians 62 within proximity of the vehicle 10, and, moving to block 124, determination, by the system controller 34A, based on data from a driver monitoring system 54, that the driver is actively and intentionally controlling the vehicle 10.

If sounds that indicate distress of pedestrians 62 have not been detected at block 120, then, the method 100 further includes, moving from block 120 to block 122, determining, with the reactive module 94 within the system controller 34A, that the vehicle 10 is being used improperly upon the occurrence of detecting, with the impact detection sensors 96 within the vehicle 10, a single impact with a pedestrian 62, and, moving to block 124, determination, by the system controller 34A, based on data from a driver monitoring system 54, that the driver is actively and intentionally controlling the vehicle 10.

If at block 122, no single impact with a pedestrian is detected, then the method 100 moves to block 126 and ends. Upon determination that the vehicle 10 is being used improperly at block 124, the method 100 further includes, moving to block 128, initiating, with the reactive module 94, counter measures including, moving to block 130, providing, via the HMI 84, visual and/or audio alerts to the driver of the vehicle 10, moving to block 132, providing, via the external speaker 88, external audio and/or visual alerts, moving to block 134, disabling, via communication with the ADAS 86 within the vehicle 10, operation of the vehicle 10, and, moving to block 136, sending, via the wireless communication module 36, notification to a remote third party 48, after which, the method 100 moves to block 126 and ends.

In an exemplary embodiment, the identifying, with the predictive module 64, the HPDL 60 at block 104 further includes probabilistically calculating, using historical data and a machine learning algorithm 76, the presence of the HPDL 60 within the pre-determined proximity of the vehicle 10.

In an exemplary embodiment, the collecting, with the plurality of onboard sensors 40*a*-40*n* and the wireless communication module 36, data related to the presence of the HPDL 60 within the pre-determined proximity of the vehicle 10 at block 102, further includes collecting data related to the presence of the HPDL 60, including calendar events, concentrations of wireless devices, known points of interest, noise levels, and camera images, and collecting data related to the proximity of the vehicle 10 to the medium threat perimeter 78, the high threat perimeter 80 and vehicle operating parameters includes vehicle speed, global navigation satellite system (GNSS) heading, and global positioning system (GP S) route guidance.

In another exemplary embodiment, the identifying, with the predictive module 64, the HPDL 60 at block 104 further includes identifying a location as an HPDL 60 if the predictive module 64 receives, from remote third-party calendar sources 48, data indicating that an event is taking place at the location, the predictive module 64 receives data indicating that a density of wireless devices 70 within the location exceeds a predetermined threshold, the predictive module 64 receives, from an external microphone 72 included within the plurality of onboard sensors 40*a*-40*n*, data that crowd noise levels measured within the area exceed a predetermined threshold, or, the predictive module 64 receives, from at least one camera 52 included within the plurality of onboard sensors 40*a*-40*n*, images that, upon analysis by an image analysis algorithm within the system controller 34A, include data indicating the presence of a crowd of pedestrians 62 at the location.

In another exemplary embodiment, the establishing a threat level with the predictive module 64 at block 110, further includes moving to block 138, establishing a first threat level when a GNSS 56 heading for the vehicle 10 is not directed toward the HPDL 60, a speed of the vehicle 10 exceeds a predetermined threshold, and the vehicle 10 is not currently located within the medium threat perimeter 78.

In another exemplary embodiment, the establishing a threat level with the predictive module 64 at block 110, further includes, moving to block 140, establishing a second threat level when a GNSS 56 heading for the vehicle 10 is not directed toward the HPDL 60, a speed of the vehicle 10 exceeds the predetermined threshold, and the vehicle 10 is currently located within the medium threat perimeter 78.

In another exemplary embodiment, the establishing a threat level with the predictive module 64 at block 110, further includes, moving to block 142, establishing a third threat level when a GNSS 56 heading for the vehicle 10 is directed toward the H PDL 60, a speed of the vehicle 10 exceeds the predetermined threshold, and the vehicle 10 is not currently located within the medium threat perimeter 78.

In another exemplary embodiment, the establishing a threat level with the predictive module 64 at block 110, further includes, moving to block 144, establishing a fourth threat level when a GNSS 56 heading for the vehicle 10 is directed toward the H PDL 60, a speed of the vehicle 10 exceeds the predetermined threshold, and the vehicle 10 is currently located within the medium threat perimeter 78.

In another exemplary embodiment, the establishing a threat level with the predictive module 64 at block 110, further includes, moving to block 146, establishing a fifth threat level when a GNSS 56 heading for the vehicle 10 is directed toward the H PDL 60, a speed of the vehicle 10 exceeds the predetermined threshold, and the vehicle 10 is currently located within the high threat perimeter 80.

In another exemplary embodiment, the initiating, with the predictive module 64, counter measures based on the threat level at block 112 further includes, moving to block 148, initiating no counter measures when the first threat level has been established at block 138 or the second threat level has been established at block 140, moving to block 150, initiating counter measures including providing, via the HMI 84 within the vehicle 10, visual and/or audio alerts to the driver of the vehicle 10 when the third threat level has been established at block 142, moving to block 152, initiating counter measures including providing visual and/or audio alerts to the driver of the vehicle 10, and limiting via communication with the ADAS 86 within the vehicle 10, a maximum speed of the vehicle 10 to a first predetermined speed limit when the fourth threat level has been established at block 144, and, moving to block 154, initiating counter measures including providing visual and/or audio alerts to the driver of the vehicle 10, limiting a maximum speed of the vehicle 10 to a second predetermined speed limit, providing external audio and/or visual alerts, and sending, via the wireless communication module 36, notification to a remote third party 48 when the fifth threat level has been established at block 146.

In an exemplary embodiment, the defining the medium threat perimeter 78 around the HPDL 60 at block 106 and the defining the high threat perimeter 80 around the HPDL 60 at block 108 further includes defining a size and shape of the medium threat perimeter 78 and a size and shape of the high threat perimeter 80 based on data related to a density pattern of pedestrians 62 within the HPDL 60, continuously monitoring the density pattern of the pedestrians 62 within the HPDL 60, and continuously, on a periodic basis, updating the size and shape of the medium threat perimeter 78 and the size and shape of the high threat perimeter 80.

In another exemplary embodiment, the providing external audio and/or visual alerts at blocks 132 and 154, further includes displaying, via an external display 90 of the vehicle 10, external visual alerts, and sending alerts to wireless devices 70 of the pedestrians 62 within the H PDL 60.

The system and method of the present disclosure provides a way to detect improper usage of a vehicle, wherein a driver of the vehicle is using the vehicle to intentionally, and with purpose, cause harm to pedestrians, to stop the improper usage and prevent further improper usage of the vehicle.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system within a vehicle for detection and prevention of improper usage of the vehicle, comprising:

a plurality of onboard sensors and a wireless communication module, each in communication with a system controller and adapted to collect data related to the presence of a high pedestrian density location (HPDL) within a pre-determined proximity of the vehicle; and a predictive module within the system controller and adapted to identify an HPDL, and, when an HPDL is identified:

define a medium threat perimeter around the H PDL;

define a high threat perimeter around the HPDL;

establish a threat level based on:

proximity of the vehicle to the medium threat perimeter and the high threat perimeter; and vehicle operating parameters; and initiate counter measures based on the threat level, including at least one of:

provide, via a human machine interface (HMI) within the vehicle, visual and/or audio alerts to a driver of the vehicle;

provide, via an external speaker, external audio and/or visual alerts;

limit, via communication with an advanced driver assistance system (ADAS) within the vehicle, a maximum speed of the vehicle; and send, via the wireless communication module, notification to a remote third party.

2. The system of claim 1 further including a reactive module within the system controller and adapted to determine that the vehicle is being used improperly upon the occurrence of determination, by the system controller, based on data from a driver monitoring system, that the driver is actively and intentionally controlling the vehicle, and any one of:

detection, by impact detection sensors within the vehicle, of multiple impacts;

actuation of a pedestrian protection algorithm within the system controller;

detection, by the system controller, via an external microphone, sounds that indicate distress of pedestrians within proximity of the vehicle; or detection, by impact detection sensors within the vehicle, of a single impact with a pedestrian; and upon determination that the vehicle is being used improperly, initiate counter measures including:

provide, via the HMI within the vehicle, visual and/or audio alerts to the driver of the vehicle;

provide, via the external speaker, external audio and/or visual alerts;

disable, via communication with the ADAS within the vehicle, operation of the vehicle; and send, via the wireless communication module, notification to a remote third party.

3. The system of claim 2, wherein, when identifying an HPDL, the predictive module within the system controller is further adapted to probabilistically calculate, using historical data and a machine learning algorithm, the presence of an HPDL within the pre-determined proximity of the vehicle.

4. The system of claim 3, wherein the plurality of onboard sensors and the wireless communication module are adapted to:

collect data related to the presence of a high pedestrian density location (HPDL), including calendar events, concentrations of wireless devices, known points of interest, noise levels, and camera images; and collect data related to the proximity of the vehicle to the medium threat perimeter, the high threat perimeter and vehicle operating parameters, including vehicle speed, global navigation satellite system (GNSS) heading, and global positioning system (GP S) route guidance.

5. The system of claim 4, wherein the predictive module is adapted to identify a location as an HPDL if:

the predictive module receives, from remote third party calendar sources, data indicating that an event is taking place at the location;

the predictive module receives data indicating that a density of wireless devices within the location exceeds a predetermined threshold;

the predictive module receives, from an external microphone included within the plurality of onboard sensors, data that crowd noise levels measured within the area exceed a predetermined threshold; or the predictive module receives, from at least one camera included within the plurality of onboard sensors, images that, upon analysis by an image analysis algorithm within the system controller, include data indicating the presence of a crowd of pedestrians at the location.

6. The system of claim 5, wherein the predictive module is further adapted to:

establish a first threat level when:

a GNSS heading for the vehicle is not directed toward the HPDL;

a speed of the vehicle exceeds a predetermined threshold; and the vehicle is not currently located within the medium threat perimeter;

establish a second threat level when:

a GNSS heading for the vehicle is not directed toward the HPDL;

a speed of the vehicle exceeds the predetermined threshold; and the vehicle is currently located within the medium threat perimeter;

establish a third threat level when:

a GNSS heading for the vehicle is directed toward the HPDL;

a speed of the vehicle exceeds the predetermined threshold; and the vehicle is not currently located within the medium threat perimeter;

establish a fourth threat level when:

a GNSS heading for the vehicle is directed toward the HPDL;

a speed of the vehicle exceeds the predetermined threshold; and the vehicle is currently located within the medium threat perimeter; and establish a fifth threat level when:

a GNSS heading for the vehicle is directed toward the HPDL;

a speed of the vehicle exceeds the predetermined threshold; and the vehicle is currently located within the high threat perimeter.

7. The system of claim 6, wherein the predictive module is adapted to:

initiate no counter measures when the first threat level or second threat level has been established;

initiate counter measures including providing, via the HMI within the vehicle, visual and/or audio alerts to the driver of the vehicle when the third threat level has been established;

initiate counter measures including provide visual and/or audio alerts to the driver of the vehicle, and limit, via communication with the ADAS within the vehicle, a maximum speed of the vehicle to a first predetermined speed limit when the fourth threat level has been established; and initiate counter measures including provide visual and/or audio alerts to the driver of the vehicle, limit a maximum speed of the vehicle to a second predetermined speed limit, provide external audio and/or visual alerts, and send, via the wireless communication module, notification to a remote third party when the fifth threat level has been established.

8. The system of claim 7, wherein the predictive module within the system controller is adapted to:

define a size and shape of the medium threat perimeter and a size and shape of the high threat perimeter based on data related to a density pattern of pedestrians within the HPDL;

continuously monitor the density pattern of the pedestrians within the HPDL; and continuously, on a periodic basis, update the size and shape of the medium threat perimeter and the size and shape of the high threat perimeter.

9. The system of claim 8, wherein, when providing external audio and/or visual alerts, the system controller is adapted to display, via an external display of the vehicle, external visual alerts.

10. The system of claim 9, wherein, when providing external audio and/or visual alerts, the system controller is adapted to send alerts to wireless devices of the pedestrians within the HPDL.

11. A method for detection and prevention of improper usage of a vehicle, comprising:

collecting, with a plurality of onboard sensors and a wireless communication module, each in communication with a system controller, data related to the presence of a high pedestrian density location (HPDL) within a pre-determined proximity of the vehicle; and identifying, with a predictive module within the system controller, an HPDL, and, when an HPDL is identified, with the predictive module:

defining a medium threat perimeter around the HPDL;

defining a high threat perimeter around the HPDL;

establishing a threat level based on:

proximity of the vehicle to the medium threat perimeter and the high threat perimeter; and vehicle operating parameters; and initiating counter measures based on the threat level, including at least one of:

providing, via a human machine interface (HMI) within the vehicle, visual and/or audio alerts to a driver of the vehicle;

providing, via an external speaker, external audio and/or visual alerts;

limiting, via communication with an advanced driver assistance system (ADAS) within the vehicle, a maximum speed of the vehicle; and sending, via the wireless communication module, notification to a remote third party.

12. The method of claim 11 further including:

determining, with a reactive module within the system controller, that the vehicle is being used improperly upon the occurrence of any one of:

detecting, with impact detection sensors within the vehicle, multiple impacts;

actuating of a pedestrian protection algorithm within the system controller;

detecting, with the system controller, via an external microphone, sounds that indicate distress of pedestrians within proximity of the vehicle; or detecting, with the impact detection sensors within the vehicle, a single impact with a pedestrian; and determination, by the system controller, based on data from a driver monitoring system, that the driver is actively and intentionally controlling the vehicle; and upon determination that the vehicle is being used improperly, initiating, with the reactive module, counter measures including:

providing, via the HMI, visual and/or audio alerts to the driver of the vehicle;

providing, via the external speaker, external audio and/or visual alerts;

disabling, via communication with the ADAS within the vehicle, operation of the vehicle; and sending, via the wireless communication module, notification to a remote third party.

13. The method of claim 12, wherein, the identifying, with the predictive module, the HPDL further includes probabilistically calculating, using historical data and a machine learning algorithm, the presence of the HPDL within the pre-determined proximity of the vehicle.

14. The method of claim 13, wherein the collecting, with the plurality of onboard sensors and the wireless communication module, data related to the presence of the HPDL within the pre-determined proximity of the vehicle further includes:

collecting data related to the presence of the HPDL, including calendar events, concentrations of wireless devices, known points of interest, noise levels, and camera images; and collecting data related to the proximity of the vehicle to the medium threat perimeter, the high threat perimeter and vehicle operating parameters, including vehicle speed, global navigation satellite system (GNSS) heading, and global positioning system (GPS) route guidance.

15. The method of claim 14, wherein the identifying, with the predictive module, the H PDL further includes identifying a location as an HPDL if:

the predictive module receives, from remote third-party calendar sources, data indicating that an event is taking place at the location;

the predictive module receives data indicating that a density of wireless devices within the location exceeds a predetermined threshold;

the predictive module receives, from an external microphone included within the plurality of onboard sensors, data that crowd noise levels measured within the area exceed a predetermined threshold; or the predictive module receives, from at least one camera included within the plurality of onboard sensors, images that, upon analysis by an image analysis algorithm within the system controller, include data indicating the presence of a crowd of pedestrians at the location.

16. The method of claim 15, wherein the establishing a threat level with the predictive module further includes:

establishing a first threat level when:

a GNSS heading for the vehicle is not directed toward the HPDL;

a speed of the vehicle exceeds a predetermined threshold; and the vehicle is not currently located within the medium threat perimeter;

establishing a second threat level when:

a GNSS heading for the vehicle is not directed toward the HPDL;

a speed of the vehicle exceeds the predetermined threshold; and the vehicle is currently located within the medium threat perimeter;

establishing a third threat level when:

a GNSS heading for the vehicle is directed toward the HPDL;

a speed of the vehicle exceeds the predetermined threshold; and the vehicle is not currently located within the medium threat perimeter;

establishing a fourth threat level when:

a GNSS heading for the vehicle is directed toward the HPDL;

a speed of the vehicle exceeds the predetermined threshold; and the vehicle is currently located within the medium threat perimeter; and establishing a fifth threat level when:

a GNSS heading for the vehicle is directed toward the HPDL;

a speed of the vehicle exceeds the predetermined threshold; and the vehicle is currently located within the high threat perimeter.

17. The method of claim 16, wherein the initiating, with the predictive module, counter measures based on the threat level further includes:

initiating no counter measures when the first threat level or second threat level has been established;

initiating countermeasures including providing, via the HMI within the vehicle, visual and/or audio alerts to the driver of the vehicle when the third threat level has been established;

initiating counter measures including providing visual and/or audio alerts to the driver of the vehicle, and limiting via communication with the ADAS within the vehicle, a maximum speed of the vehicle to a first predetermined speed limit when the fourth threat level has been established; and initiating counter measures including providing visual and/or audio alerts to the driver of the vehicle, limiting a maximum speed of the vehicle to a second predetermined speed limit, providing external audio and/or visual alerts, and sending, via the wireless communication module, notification to a remote third party when the fifth threat level has been established.

18. The method of claim 17, wherein the defining the medium threat perimeter around the HPDL and the defining the high threat perimeter around the HPDL further includes:

defining a size and shape of the medium threat perimeter and a size and shape of the high threat perimeter based on data related to a density pattern of pedestrians within the HPDL;

continuously monitoring the density pattern of the pedestrians within the HPDL; and continuously, on a periodic basis, updating the size and shape of the medium threat perimeter and the size and shape of the high threat perimeter.

19. The method of claim 18, wherein, the providing external audio and/or visual alerts further includes:

displaying, via an external display of the vehicle, external visual alerts; and sending alerts to wireless devices of the pedestrians within the HPDL.

20. A system within a vehicle for detection and prevention of improper usage of the vehicle, comprising:

a plurality of onboard sensors and a wireless communication module, each in communication with a system controller and adapted to:

collect data related to the presence of a high pedestrian density location (HPDL) within a pre-determined proximity of the vehicle including calendar events, concentrations of wireless devices, known points of interest, noise levels, and camera images; and collect data related to the proximity of the vehicle to a medium threat perimeter, a high threat perimeter and vehicle operating parameters, including vehicle speed, global navigation satellite system (GNSS) heading, and global positioning system (GPS) route guidance;

a predictive module within the system controller and adapted to identify an HPDL, wherein the predictive module is adapted to identify a location as an HPDL if:

the predictive module receives, from remote third party calendar sources, data indicating that an event is taking place at the location;

the predictive module receives data indicating that a density of wireless devices within the location exceeds a predetermined threshold;

the predictive module receives, from an external microphone included within the plurality of onboard sensors, data that crowd noise levels measured within the area exceed a predetermined threshold; or the predictive module receives, from at least one camera included within the plurality of onboard sensors, images that, upon analysis by an image analysis algorithm within the system controller, include data indicating the presence of a crowd of pedestrians at the location; and when an HPDL is identified, the predictive module is further adapted to:

define the medium threat perimeter around the HPDL;

define the high threat perimeter around the HPDL;

establish a first threat level when a GNSS heading for the vehicle is not directed toward the HPDL, a speed of the vehicle exceeds a predetermined threshold, and the vehicle is not currently located within the medium threat perimeter, and initiate no counter measures;

establish a second threat level when a GNSS heading for the vehicle is not directed toward the HPDL, a speed of the vehicle exceeds a predetermined threshold, and the vehicle is currently located within the medium threat perimeter, and initiate no counter measures;

establish a third threat level when a GNSS heading for the vehicle is directed toward the HPDL, a speed of the vehicle exceeds a predetermined threshold, and the vehicle is not currently located within the medium threat perimeter, and initiate counter measures including providing, via the HMI within the vehicle, visual and/or audio alerts to the driver of the vehicle;

establish a fourth threat level when a GNSS heading for the vehicle is directed toward the HPDL, a speed of the vehicle exceeds a predetermined threshold, and the vehicle is currently located within the medium threat perimeter, and initiate counter measures including provide visual and/or audio alerts to the driver of the vehicle, and limit, via communication with an advanced driver assistance system (ADAS) within the vehicle, a maximum speed of the vehicle to a first predetermined speed limit;

establish a fifth threat level when a GNSS heading for the vehicle is directed toward the HPDL, a speed of the vehicle exceeds the predetermined threshold, and the vehicle is currently located within the high threat perimeter, and initiate counter measures including provide visual and/or audio alerts to the driver of the vehicle, limit a maximum speed of the vehicle to a second predetermined speed limit, provide external audio and/or visual alerts, and send, via the wireless communication module, notification to a remote third party; and a reactive module within the system controller and adapted to determine that the vehicle is being used improperly upon the occurrence of determination, by the system controller, based on data from a driver monitoring system, that the driver is actively and intentionally controlling the vehicle, and anyone of:

detection, by impact detection sensors within the vehicle, of multiple impacts;

actuation of a pedestrian protection algorithm within the system controller;

detection, by the system controller, via an external microphone, sounds that indicate distress of pedestrians within proximity of the vehicle; or detection, by impact detection sensors within the vehicle, of a single impact with a pedestrian; and upon determination that the vehicle is being used improperly, initiate counter measures including:

provide, via the HMI within the vehicle, visual and/or audio alerts to the driver of the vehicle;

provide, via the external speaker, external audio and/or, via an external display, visual alerts;

disable, via communication with the ADAS within the vehicle, operation of the vehicle; and send, via the wireless communication module, notification to a remote third party.

* * * * *